(12) United States Patent
Boppana et al.

(10) Patent No.: US 9,565,566 B1
(45) Date of Patent: Feb. 7, 2017

(54) 5 GHZ SUB-BAND OPERATIONS

(71) Applicant: QUALCOMM Incorporated, San Diego, CA (US)

(72) Inventors: Ramakrishna Choudary Boppana, Chennai (IN); Nagendra Kumar Pratti, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/832,237

(22) Filed: Aug. 21, 2015

(51) Int. Cl.
*H04W 16/12* (2009.01)
*H04B 1/40* (2015.01)
*H04W 84/12* (2009.01)

(52) U.S. Cl.
CPC ............... *H04W 16/12* (2013.01); *H04B 1/40* (2013.01); *H04W 84/12* (2013.01)

(58) Field of Classification Search
CPC .............................. H04W 16/12; H04W 84/12
See application file for complete search history.

(56) References Cited

U.S. PATENT DOCUMENTS

| | | | |
|---|---|---|---|
| 8,553,576 B2 | 10/2013 | Park | |
| 2010/0022204 A1* | 1/2010 | Rofougaran | ........ H01P 1/20372 455/90.2 |
| 2013/0002373 A1 | 1/2013 | Robert et al. | |
| 2013/0065638 A1 | 3/2013 | Cai et al. | |
| 2013/0072209 A1* | 3/2013 | Haartsen | ............... H04W 72/02 455/452.1 |
| 2013/0315117 A1* | 11/2013 | Le Naour | ................ H04B 1/44 370/297 |
| 2014/0036892 A1 | 2/2014 | Zhu | |
| 2016/0081010 A1* | 3/2016 | Seok | ................ H04W 74/0816 370/329 |

OTHER PUBLICATIONS

Netgear Support, "How does my Nighthawk X6 R8000 router's tri-band WiFi improve the speed and performance of a device?" Retrieved date: May 28, 2015,Retrieved from the Internet < URL: http://kb.netgear.com/app/answers/detail/a__id/25362/~/how-does-my-nighthawk-x6-r8000-routers-tri-band-wifi-improve-the-speed-and >, 3 Pages.
WhitePaper, "Wireless without Compromise: Delivering the promise of IEEE 802.11n," MERU Networks, Sep. 8, 2008, 24 pages.
WLAN Radio Frequency Design Considerations, Enterprise Mobility 4.1 Design Guide, Chapter 3, OL-14435-01,Dec. 9, 2008,36 Pages.
International Search Report and Written Opinion—PCT/US2016/040175—ISA/EPO—Oct. 4, 2016.

\* cited by examiner

*Primary Examiner* — Omar Ghowrwal
(74) *Attorney, Agent, or Firm* — Paradice and Li LLP

(57) ABSTRACT

A method and apparatus for operating multiple transceivers concurrently in a 5 GHz wireless frequency band. A wireless device includes at least a first transceiver and a second transceiver, and operates the first transceiver in a first sub-band of the 5 GHz wireless frequency band. The wireless device selects a second sub-band of the 5 GHz wireless frequency band based at least in part on the first sub-band, and operates the second transceiver in the second sub-band while concurrently operating the first transceiver in the first sub-band. For example, the second sub-band may be frequency separated from the first sub-band by at least a threshold frequency gap.

14 Claims, 10 Drawing Sheets

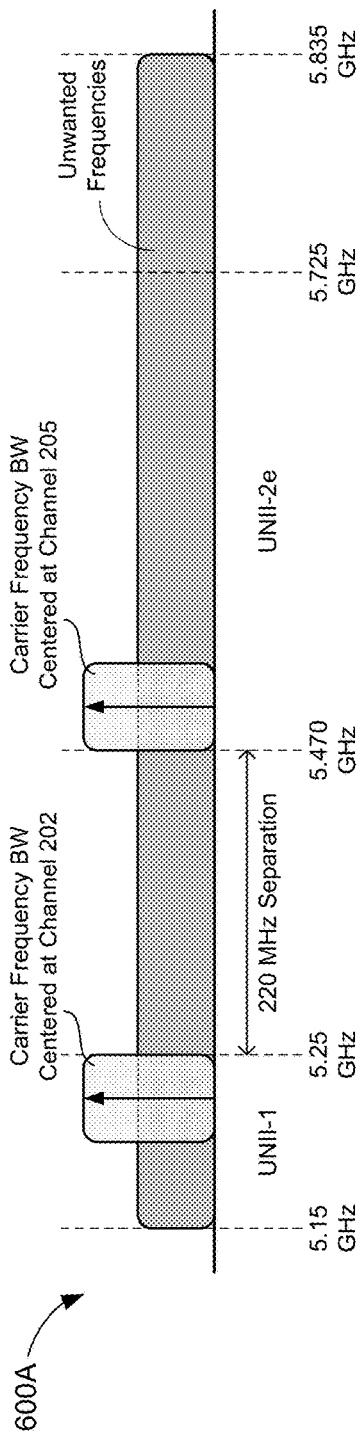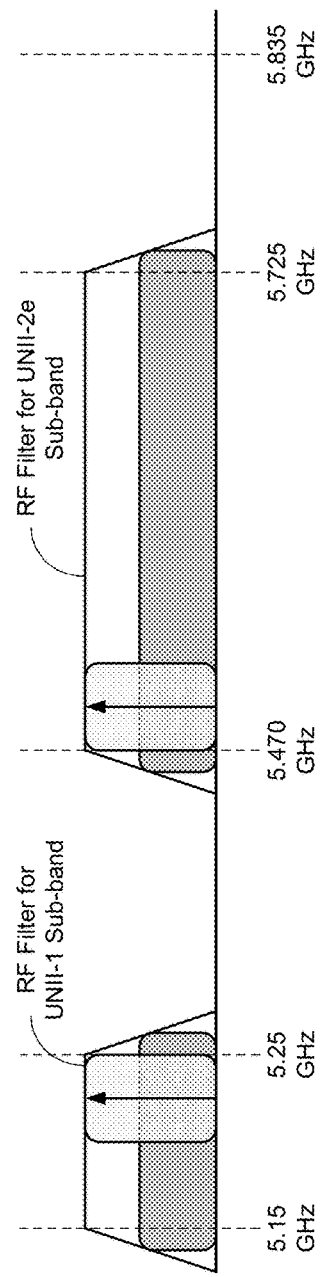

5 GHZ SUB-BAND OPERATIONS

TECHNICAL FIELD

The present embodiments relate generally to wireless networks, and specifically to operating multiple wireless radios of a wireless device in the 5 GHz wireless frequency band.

BACKGROUND OF RELATED ART

Dual-band wireless (e.g., WI-FI) devices are capable of operating (e.g., transmitting and/or receiving wireless signals) on the 2.4 GHz and 5 GHz frequency bands, simultaneously. For example, a dual-band wireless device may transmit and/or receive wireless signals on a 2.4 GHz wireless channel while concurrently transmitting and/or receiving wireless signals on a 5 GHz wireless channel. Further, due to the wide bandwidth of the 5 GHz frequency band, modern wireless devices may include multiple 5 GHz (5G) radios that may be operated concurrently to increase the throughput of the device. For example, a WI-FI access point (AP) with two 5G radios may allocate the first 5G radio for wireless communications with a first client device, and may allocate the second 5G radio for wireless communications with a second client device. Alternatively, the AP may use both 5G radios to increase the bandwidth of communications for a single client device (e.g., using multiple spatial streams).

The entire 5 GHz frequency spectrum (e.g., 5.15-5.835 GHz) is typically available to each 5G radio of a wireless device. For example, during initialization, each 5G radio may select any channel in the 5 GHz frequency band on which to transmit and/or receive wireless signals. Moreover, in conventional wireless devices, each 5G radio operates independently of other 5G radios residing on the same device. However, allowing multiple 5G radios on the same device to operate simultaneously and independently of one another may result in one 5G radio operating in the same 5 GHz channel as another 5G radio, thus causing signal interference and isolation problems.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method and apparatus for operating multiple transceivers concurrently in a 5 GHz wireless frequency band. A wireless device includes at least a first transceiver and a second transceiver, and operates the first transceiver in a first sub-band of the 5 GHz wireless frequency band. The wireless device selects a second sub-band of the 5 GHz wireless frequency band based at least in part on a frequency of the first sub-band, and operates the second transceiver in the second sub-band while concurrently operating the first transceiver in the first sub-band. For example, the second sub-band may be separated in frequency from the first sub-band by at least a threshold (e.g., 220 MHz) frequency gap. A microstrip filter may be used to filter communications for at least one of the first transceiver or the second transceiver.

A frequency spectrum of the 5 GHz wireless frequency band may be subdivided into at least a first range of frequencies and a second range of frequencies such that each of a plurality of sub-bands of the 5 GHz wireless frequency band falls within one of the first range of frequencies or the second range of frequencies. In particular, an upper bound of the first range of frequencies may be at least a threshold frequency (e.g., 120 MHz) below a lower bound of the second range of frequencies. For example, the first range of frequencies may include Unlicensed National Information Infrastructure (UNII) radio bands UNII-1 and UNII-2, and the second range of frequencies may include UNII radio bands UNII-2e and UNII-3.

In example embodiments, the wireless device selects the second sub-band from the second range of frequencies when the first sub-band falls within the first range of frequencies. On the other hand, the wireless device may select the second sub-band from the first range of frequencies when the first sub-band falls within the second range of frequencies. Still further, for some embodiments, the wireless device may operate a third transceiver in a 2.4 GHz wireless frequency band while concurrently operating the first and second transceivers in the respective first and second sub-bands of the 5 GHz wireless frequency band.

BRIEF DESCRIPTION OF THE DRAWINGS

The present embodiments are illustrated by way of example and are not intended to be limited by the figures of the accompanying drawings. Like numbers reference like elements throughout the drawings and specification.

FIGS. 6A-6B are frequency spectrum diagrams depicting an example configuration of a pair of sub-band synchronized transceivers.

DETAILED DESCRIPTION

Figure 1:
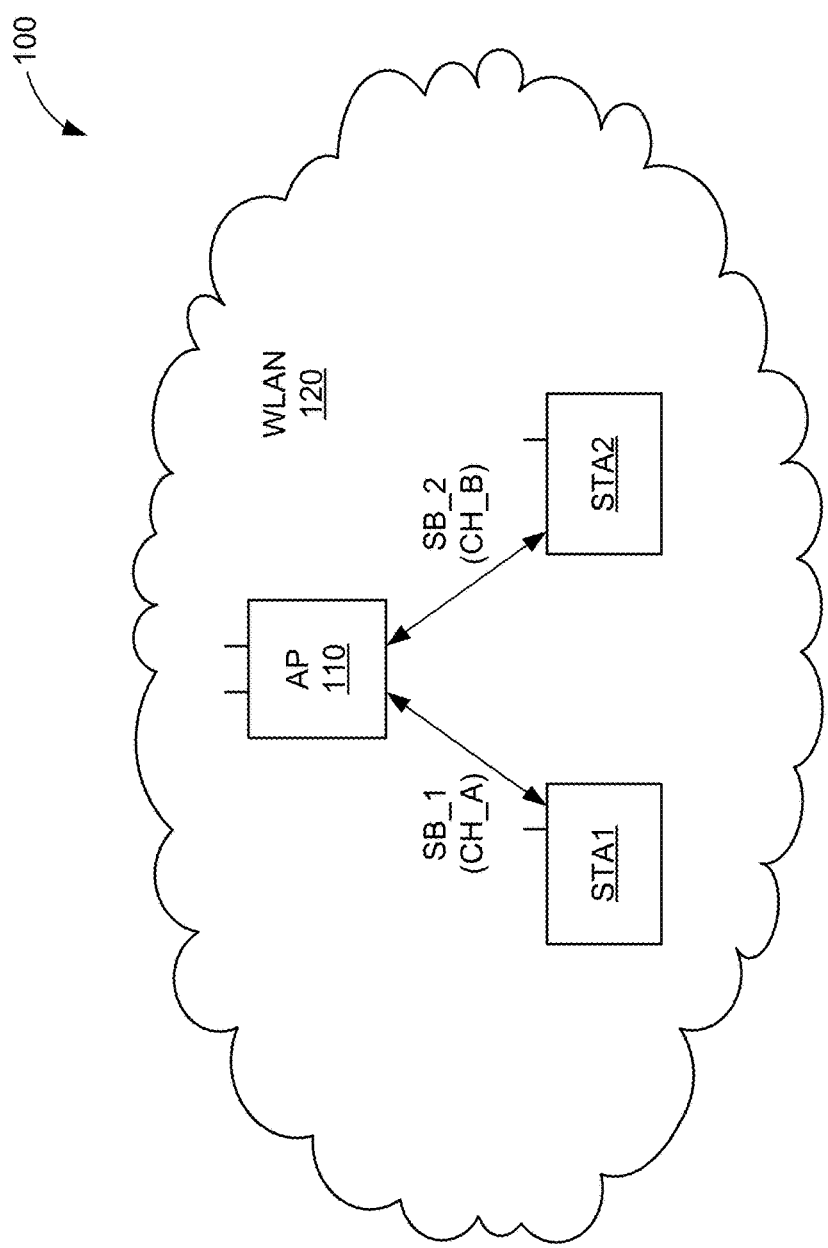
FIG. 1 shows an example wireless system within which the example embodiments may be implemented.

The example embodiments are described below in the context of WI-FI enabled devices for simplicity only. It is to be understood that the example embodiments are equally applicable to other wireless networks (e.g., cellular networks, pico networks, femto networks, satellite networks), as well as for systems using signals of one or more wired standards or protocols (e.g., Ethernet and/or HOMEPLUG/PLC standards). As used herein, the terms "WLAN" and "WI-FI®" may include communications governed by the IEEE 802.11 family of standards, BLUETOOTH® (Bluetooth), HiperLAN (a set of wireless standards, comparable to the IEEE 802.11 standards, used primarily in Europe), and other technologies used in wireless communications. Thus, the terms "WLAN" and "WI-FI" may be used interchangeably herein. In addition, although described below in terms of an infrastructure WLAN system including one or more APs and a number of STAs, the example embodiments are equally applicable to other WLAN systems including, for example, multiple WLANs, peer-to-peer (or Independent Basic Service Set) systems, WI-FI DIRECT systems, and/or Hotspots. In addition, although described herein in terms of exchanging data frames between wireless devices, the example embodiments may be applied to the exchange of any data unit, packet, and/or frame between wireless devices.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present embodiments. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processes and other symbolic representations of operations on data bits within a computer memory. These descriptions and representations are the means used by those skilled in the data processing arts to most effectively convey the substance of their work to other skilled in the art.

The interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "calculating," "monitoring," "comparing," "applying," "updating," "measuring," "deriving," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

FIG. 1 shows an example wireless system 100 within which the example embodiments may be implemented. The wireless system 100 is shown to include two wireless stations STA1 and STA2, a wireless access point (AP) 110, and a wireless local area network (WLAN) 120. The WLAN 120 may be formed by a plurality of WI-FI access points (APs) that may operate according to the IEEE 802.11 family of standards (or according to other suitable wireless protocols). Thus, although only one AP 110 is shown in FIG. 1 for simplicity, it is to be understood that WLAN 120 may be formed by any number of access points such as AP 110. The AP 110 is assigned a unique MAC address that is programmed therein by, for example, the manufacturer of the access point. Similarly, each of STA1 and STA2 is also assigned a unique MAC address.

Each of the stations STA1 and STA2 may be any suitable WI-FI enabled wireless device including, for example, a cell phone, personal digital assistant (PDA), tablet device, laptop computer, or the like. Each station (STA) may also be referred to as user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, each STA may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that store instructions for performing operations described below with respect to FIGS. 8 and 9.

The AP 110 may be any suitable device that allows one or more wireless devices to connect to a network (e.g., a local area network (LAN), wide area network (WAN), metropolitan area network (MAN), and/or the Internet) via AP 110 using WI-FI, BLUETOOTH, or any other suitable wireless communication standards. In some embodiments, the AP 110 may be wireless station configured as a software enabled access point ("SoftAP"). For at least one embodiment, the AP 110 may include one or more transceivers, a network interface, one or more processing resources, one or more memory resources, and a power source. The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 8 and 9.

For the stations STA1 and STA2 and/or the AP 110, the one or more transceivers may include WI-FI transceivers, BLUETOOTH transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communications protocols. For example, the WI-FI transceiver may communicate within a 2.4 GHz frequency band and/or within a 5 GHz frequency band in accordance with the IEEE 802.11 specification. The cellular transceiver may communicate within various RF frequency bands in accordance with a 4G Long Term Evolution (LTE) protocol described by the $3^{rd}$ Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within stations STA1 and STA2 and/or AP 110 may be any technically feasible transceiver such as a ZIGBEE transceiver described by the ZIGBEE specification, a Wi-Gig transceiver, and/or a HOMEPLUG transceiver described by a specification from the HomePlug Alliance.

The AP 110 may be configured to communicate with both of the stations STA1 and STA2, concurrently, in the same frequency band. For example, the AP 110 may include multiple transceivers and/or wireless radios (not shown for simplicity) that operate on (e.g., transmit and receive wireless signals over) the same frequency band (e.g., the 5 GHz frequency band). Thus, the AP 110 may include a first transceiver to communicate with STA1 and a second transceiver to communicate with STA2. In example embodiments, each transceiver may be configured to operate within a different sub-band than other transceivers operating on the same frequency band. More specifically, the AP 110 may ensure that the "active" sub-bands (e.g., sub-bands associated with active transceivers) are frequency-separated by at least a threshold bandwidth. The threshold bandwidth may be wide enough to provide sufficient frequency isolation for each of the transceivers operating in the same frequency band, for example, such that signal interference between the transceivers is significantly reduced and/or nullified.

For example, the first transceiver of AP 110 may be configured to operate within a first sub-band (SB_1) of the 5 GHz frequency band, and the second transceiver of AP 110 may be configured to operate within a second sub-band (SB_2) of the 5 GHz frequency band. Thus, when selecting a wireless channel on which to communicate with STA1, the first transceiver may be limited to channels within the first sub-band SB_1 (e.g., CH_A). Similarly, when selecting a wireless channel on which to communicate with STA2, the second transceiver may be limited to channels within the second sub-band SB_2 (e.g., CH_B). As described above, the sub-bands SB_1 and SB_2 are separated in frequency by at least a threshold bandwidth. Accordingly, the respective communications channels CH_A and CH_B are also separated in frequency by at least the threshold bandwidth. This ensures that any channel selected by the first transceiver (e.g., within the first sub-band SB_1) will be sufficiently isolated from any channel selected by the second transceiver (e.g., within the second sub-band SB_2).

Still further, for some embodiments, the AP 110 may include additional transceivers that are configured for operation in other frequency bands (e.g., the 2.4 GHz band). For example, the AP 110 may communicate with a third wireless station (not shown for simplicity) over a 2.4 GHz channel, concurrently and without interference, while communicating with stations STA1 and STA2 over respective channels of the 5 GHz frequency band (e.g., channels CH_A and CH_B, respectively). This dual-band operation may allow for even greater throughput and/or more spatial streams.

Figure 2:
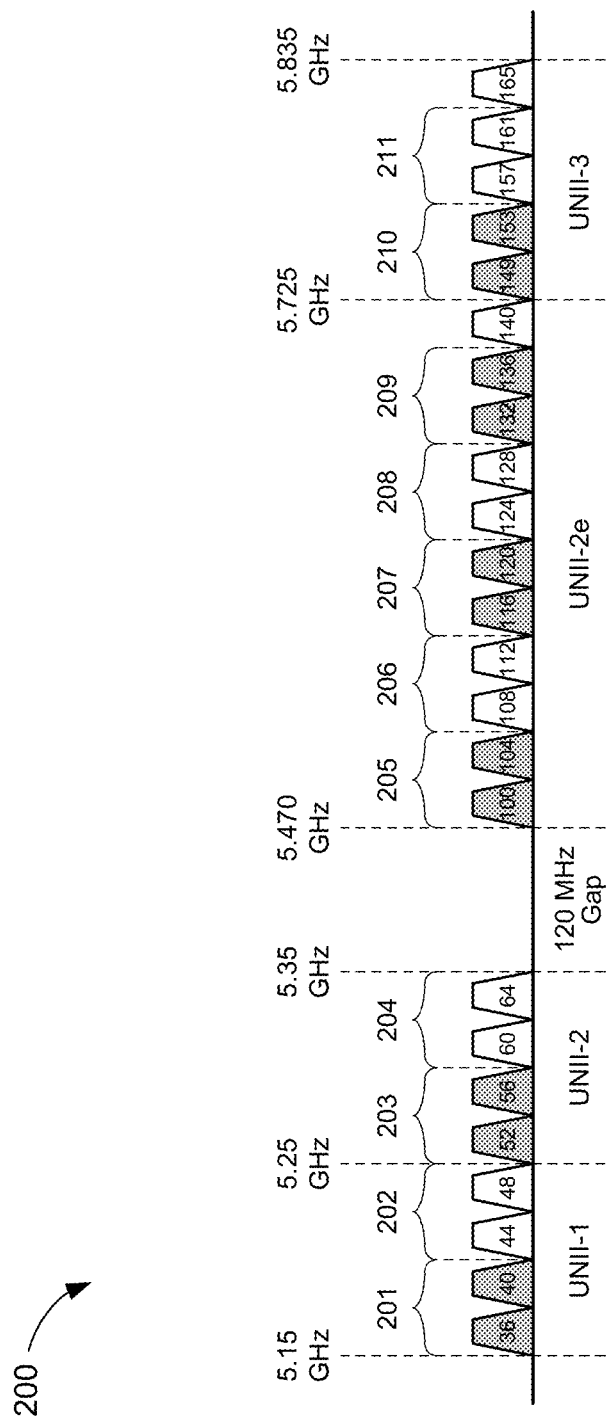
FIG. 2 is a frequency spectrum diagram depicting an example 5 GHz frequency band.

FIG. 2 is a frequency spectrum diagram 200 depicting an example 5 GHz frequency band. The 5 GHz frequency band ranges from 5.15 GHz to 5.835 GHz and may be subdivided into a number of Unlicensed National Information Infrastructure (UNII) radio bands. For example, the usable sub-bands in the 5 GHz frequency band (e.g., as defined by IEEE 802.11 standards) may include a UNII-1 sub-band (e.g., 5.15-5.25 GHz), a UNII-2 sub-band (e.g., 5.25-5.35 GHz), a UNII-2e sub-band (e.g., 5.470-5.725 GHz), and a UNII-3 sub-band (e.g., 5.725-5.835 GHz). Each of the sub-bands includes a number of 20 MHz channels (e.g., channels 36-165). The 20 MHz channels may be grouped (e.g., paired) with one another to form eleven 40 MHz channels (e.g., channels 201-211). A 120 MHz wide frequency band or gap exists between the UNII-2 sub-band and the UNII-2e sub-band (e.g., 5.35-5.47 GHz); wireless communications are restricted in this 120 MHz wide frequency region.

Although the total available bandwidth in the 5 GHz frequency band is relatively large (e.g., compared to the 2.4 GHz frequency band), two or more transceivers operating in the 5 GHz frequency band may still interfere with one another if they independently select the same, or substantially close, 5 GHz channels. For example, with reference to FIG. 1, if the first and second transceivers of the AP 110 were to operate on different channels of the same sub-band (e.g., channels 201 and 202, respectively, of sub-band UNII-1), each of the transceivers may experience interference caused by noise and/or communications on an adjacent channel. For example, channel conditions and/or other sources of interference may cause communications on at least one of the channels (e.g., channel 201) to overlap and/or interfere with communications on another channel (e.g., channel 202). A similar problem may exist if the first and second transceivers of the AP 110 were to operate on different channels of adjacent sub-bands (e.g., channels 202 and 203, respectively, of sub-bands UNII-1 and UNII-2). Moreover, existing filter technology may not provide sufficient attenuation at the desired frequencies to sufficiently isolate the first transceiver from the second transceiver (or to sufficiently isolate the second transceiver from the first transceiver).

In example embodiments, channel selection by transceivers within the same device may be coordinated in such a manner as to provide sufficient isolation between transceivers operating in the same frequency band. For example, with reference to the example frequency band 300 depicted in FIG. 3, the 5 GHz frequency band may be bifurcated by the 120 MHz gap into a lower frequency range 310 (e.g., 5.15-5.35 GHz) and an upper frequency range 320 (e.g., 5.470-5.835 GHz). Thus, an upper bound of the lower range 310 of frequencies is at least a threshold frequency gap (e.g., of 120 MHz) below a lower bound of the upper range 320 of frequencies. Accordingly, with reference to FIG. 1, channel selection for the transceivers within the AP 110 may be coordinated, for example, to ensure that no two transceivers operate in the same frequency range.

For example, if the AP 110 selects a channel in the lower frequency range 310 (e.g., 20 MHz channels 36-64 or 40 MHz channels 201-204) for its first transceiver, the AP 110 may limit the channel selection for its second transceiver to the upper frequency range 320 (e.g., 20 MHz channels 100-165 or 40 MHz channels 205-211). On the other hand, if the AP 110 selects a channel in the upper frequency range 320 for the first transceiver, the AP 110 may limit the channel section for the second transceiver to the lower frequency range 310. This ensures that there will be a buffer of at least 120 MHz between the operating frequencies of the first transceiver and the second transceiver (e.g., between channels CH_A and CH_B).

For some embodiments, the 5 GHz sub-bands (e.g., UNII-1, UNII-2, UNII-2e, and UNII-3) may be grouped in a manner that maximizes the frequency separation between sub-bands belonging to the same group. For example, a first group of sub-bands (e.g., group A) may include sub-bands UNII-1 and UNII-2e, and a second group of sub-bands (e.g., group B) may include sub-bands UNII-2 and UNII-3. The sub-bands in group A are separated by 220 MHz, and the sub-bands in group B are separated by 365 MHz. Accordingly, channel selection for the transceivers within the AP 110 may be coordinated such that both transceivers operate in different sub-bands of the same group.

For example, if the AP 110 selects a channel in the lower frequency range 310 of group A (e.g., within sub-band UNII-1) for its first transceiver, the AP 110 may limit the channel selection for its second transceiver to the same group (e.g., group A) of the upper frequency range 320 (e.g., within sub-band UNII-2e). In another example, if the AP 110 selects a channel in the upper frequency range 320 of group B (e.g., within sub-band UNII-3) for the first transceiver, the AP 110 may limit the channel selection for the second transceiver to the same group (e.g., group B) of the lower frequency range 310 (e.g., within sub-band UNII-2). This ensures that there will be a buffer of at least 220 MHz between the operating frequencies of the first transceiver and the second transceiver (e.g., between channels CH_A and CH_B, and between sub-bands SB_1 and SB_2).

Figure 4:
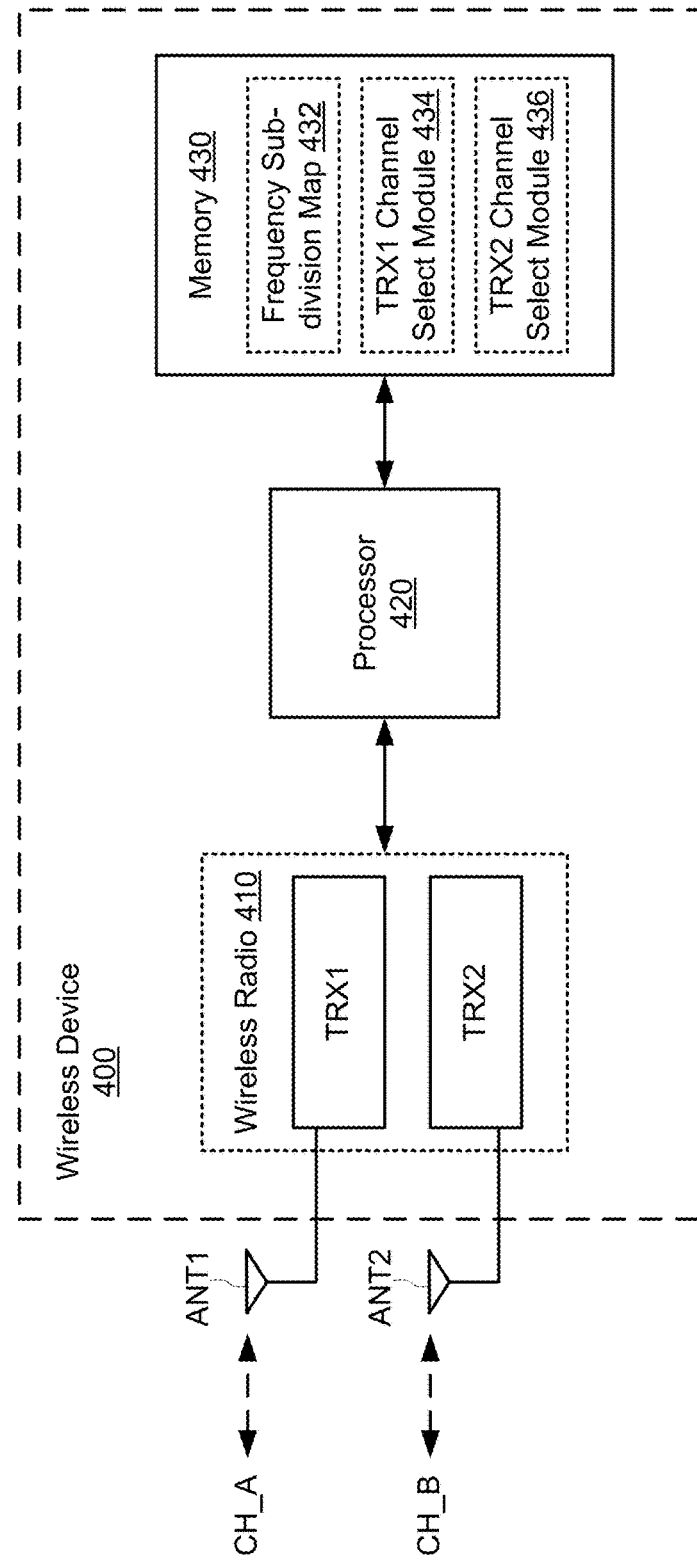
FIG. 4 shows a wireless device in accordance with example embodiments.

FIG. 4 shows a wireless device 400 in accordance with example embodiments. The wireless device 400 may be one embodiment of the AP 110 and/or any of the stations STA1-STA2 of FIG. 1. The wireless device 400 includes at least a wireless radio 410, a processor 420, a memory 430, a first antenna ANT1, and a second antenna ANT2. The wireless radio 410 may be coupled to antennas ANT1-ANT2 either directly or through an antenna selection circuit (not shown for simplicity). The wireless radio 410 may be used to transmit signals to and receive signals from APs, STAs, and/or other suitable wireless devices. The wireless radio 410 may also be used to scan the surrounding environment to detect and identify nearby APs and/or STAs.

For the example embodiment of FIG. 4, the wireless radio 410 is shown to include two transceivers TRX1 and TRX2 that may be used to communicate wirelessly with other suitable wireless devices (e.g., including wireless access points and/or wireless stations). Although not shown in FIG. 4 for simplicity, the first transceiver TRX1 may include a first transmit chain to process and transmit signals to another wireless device via antenna ANT1, and may include a first receive chain to process signals received via antenna ANT1. Similarly, the second transceiver TRX2 may include a second transmit chain to process and transmit signals to another wireless device via antenna ANT2, and may include a second receive chain to process signals received via antenna ANT2.

The wireless radio 410 is depicted in FIG. 4 as including only two transceivers TRX1 and TRX2 and two antennas ANT1-ANT2 for simplicity only; for other embodiments, wireless radio 410 may include any suitable number of transceiver chains TRX that may be coupled to any suitable number of antennas. Thus, for at least some embodiments, the wireless device 400 may be configured for multiple-input, multiple-output (MIMO) operations. The MIMO operations may include single-user MIMO (SU-MIMO) operations and multi-user MIMO (MU-MIMO) operations. In example embodiments, the wireless radio 410 is configured for operation in the 5 GHz wireless frequency band. In other embodiments, the wireless device 400 may include additional wireless radios (not shown for simplicity), for example, to communicate over other frequency bands (e.g., the 2.4 GHz band).

Memory 430 may include a frequency subdivision map 432 which indicates a logical relationship between the channels of a particular wireless frequency band (e.g., the 5 GHz frequency band). More specifically, the frequency subdivision map 432 may be used to ensure that the operating frequencies (e.g., channels) for each of the transceivers TRX1 and TRX2 of the wireless radio 410 are separated by a threshold bandwidth or frequency gap. For some embodiments, the frequency subdivision map 432 may separate the frequency band into a lower frequency range (e.g., the lower frequency range 310 of FIG. 3) and an upper frequency range (e.g., the upper frequency range 320), wherein the frequencies are separated by a threshold bandwidth (e.g., 120 MHz). For other embodiments, the frequency subdivision map 432 may further subdivide each frequency range into a first group of sub-bands (e.g., group A) and a second group of sub-bands (e.g., group B), wherein sub-bands belonging to the same group are separated by at least a threshold bandwidth (e.g., 220 MHz).

Memory 430 may also include a non-transitory computer-readable medium (e.g., one or more non-volatile memory elements, such as EPROM, EEPROM, Flash memory, a hard drive, etc.) that may store the following software modules:
- a first transceiver (TRX1) channel selection module 434 to select an operating frequency for transceiver TRX1 based at least in part on an operating frequency of transceiver TRX2 and the frequency subdivision map 432; and
- a second transceiver (TRX2) channel selection module 436 to select an operating frequency for transceiver TRX2 based at least in part on an operating frequency of transceiver TRX1 and the frequency subdivision map 432.

Each software module includes instructions that, when executed by processor 420, causes the wireless device 400 to perform the corresponding functions. The non-transitory computer-readable medium of memory 430 thus includes instructions for performing all or a portion of the operations described below with respect to FIGS. 8 and 9.

Processor 420, which is shown in the example of FIG. 4 as coupled to wireless radio 410 and memory 430, may be any suitable one or more processors capable of executing scripts or instructions of one or more software programs stored in the wireless device 400 (e.g., within memory 430). For example, processor 420 may execute the TRX1 channel section module 434 to select an operating frequency for transceiver TRX1 based at least in part on an operating frequency of transceiver TRX2 and the frequency subdivision map 432. Processor 420 may also execute the TRX2 channel section module 436 to select an operating frequency for transceiver TRX2 based at least in part on an operating frequency of transceiver TRX1 and the frequency subdivision map 432.

Figure 5:
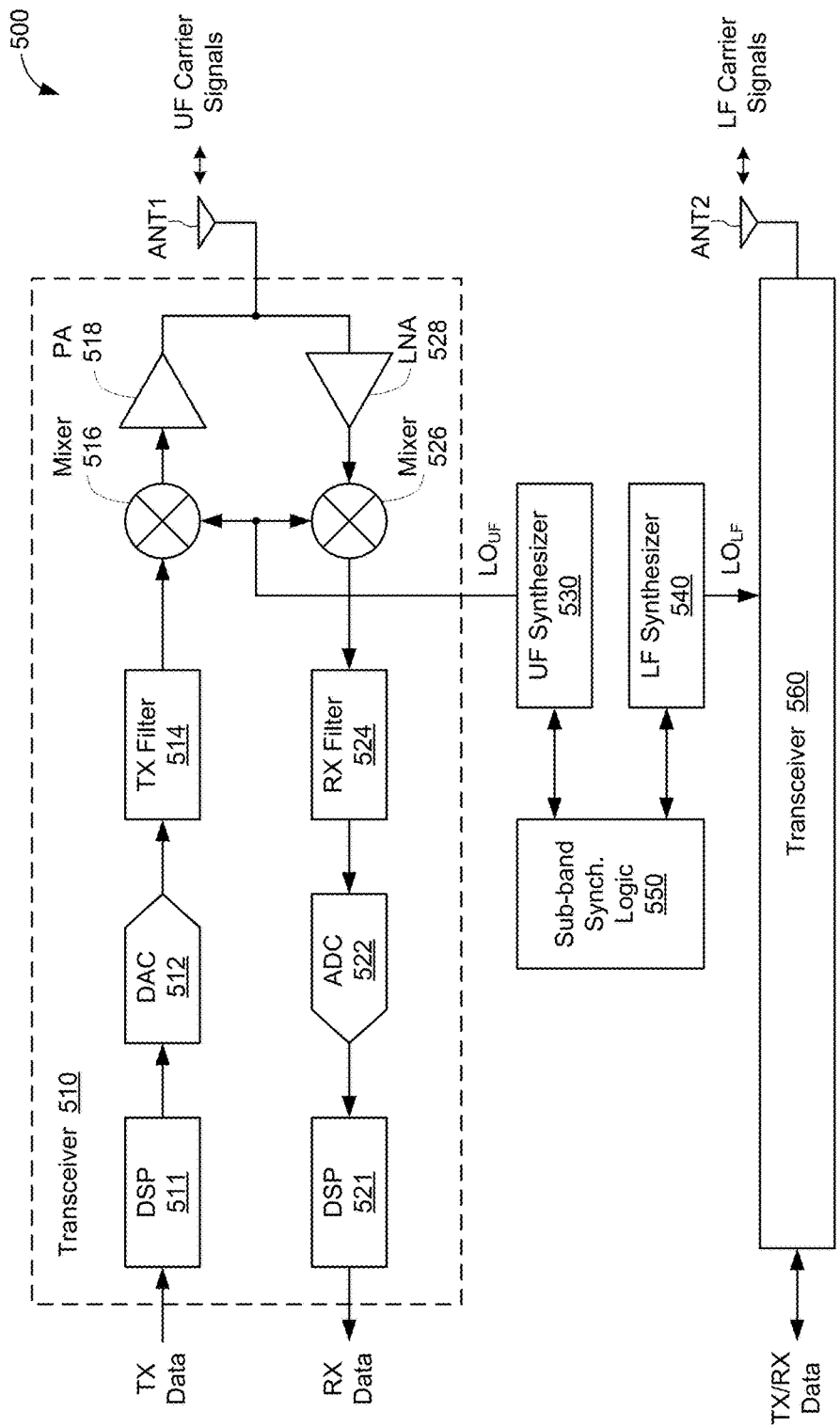
FIG. 5 shows a wireless radio with multiple frequency-synchronized transceivers, in accordance with example embodiments.

FIG. 5 shows a wireless radio 500 with multiple frequency-synchronized transceivers, in accordance with example embodiments. The wireless radio 500 may be implemented by a wireless device (e.g., such as the AP 110 and/or stations STA1 and STA2 of FIG. 1) to transmit and receive data signals over a wireless medium. For example, the wireless radio 500 may be one embodiment of the wireless radio 410 of FIG. 4. The wireless radio 500 includes at least two transceivers 510 and 560, an upper frequency (UF) synthesizer 530, a lower frequency (LF) synthesizer 540, and sub-band synchronization logic 550. Although only the components for transceiver 510 are shown in the example of FIG. 5 for simplicity, transceiver 560 may include components that are substantially similar, if not identical, to the components of transceiver 510 (e.g., as described in greater detail below). For some embodiments, the transceivers 510 and 560 may reside on separate die and/or integrated circuits (ICs).

Transceiver 510 includes a transmit chain (e.g., elements 511-518) and a receive chain (e.g., elements 521-528) coupled to a first antenna ANT1. The transmit chain includes a digital signal processing (DSP) circuit 511, a digital-to-analog converter (DAC) 512, a TX filter 514, a mixer 516, and a power amplifier (PA) 518. The transmit chain may be used to transmit outgoing (TX) data signals to another device (not shown for simplicity). For example, the DSP circuit 511 may convert a set of TX data to a digital data stream. The DAC 512 may convert the digital data stream to an analog data signal, which is filtered by the TX filter 514. The filtered analog data signal is then up-converted to a carrier frequency by the mixer 516, for example, by mixing the analog data signal with a local oscillator signal ($LO_{UF}$) generated by the UF frequency synthesizer 530. The up-converted analog signal is amplified by the PA 518 and subsequently transmitted onto the wireless medium via the first antenna ANT1.

The receive chain includes a DSP circuit 521, an analog-to-digital converter (ADC) 522, an RX filter 524, a mixer 526, and a low-noise amplifier (LNA) 528. The receive chain may be used to receive incoming (RX) data signals transmitted by another device (not shown for simplicity). For example, the LNA 528 amplifies a signal received by the first antenna ANT1, and forwards the received signal to the mixer 526. The mixer 526 down-converts the received data signal, for example, by mixing the data signal with the local oscillator signal $LO_{UF}$ generated by the UF frequency synthesizer 530. The data signal may be filtered by the RX filter 524 and converted to a digital data stream via the ADC 522. The digital data stream may then be processed by the DSP circuit 521 to recover a set of RX data.

Although the DSP circuits 511 and 521 are depicted in the example implementation of FIG. 5 as being included within transceiver 510, respectively, for other implementations, the DSP circuits 511 and 521 may be separate from the transceiver 510. Further, for at least some implementations, the DSP circuits 511 and 521 may correspond to a baseband processor (not shown for simplicity) of the wireless device 400 of FIG. 4.

As described above, the UF synthesizer 530 may be used to up-convert outgoing data signals to, and down-convert incoming data signals from, a carrier frequency that corresponds to the operating frequency or channel of transceiver 510. In example embodiments, the local oscillator signal $LO_{UF}$ generated by the UF synthesizer 530 may correspond with an upper frequency range of a given frequency band (e.g., upper frequency range 320 of FIG. 3). Similarly, the LF synthesizer 540 may be used to up-convert outgoing data signals to, and down-convert incoming data signals from, a carrier frequency that corresponds to the operating frequency or channel of transceiver 560. In example embodiments, the local oscillator signal $LO_{LF}$ generated by the LF synthesizer 540 may correspond with a lower frequency range of the given frequency band (e.g., lower frequency range 310 of FIG. 3).

The UF synthesizer 530 and LF synthesizer 540 may be configured to operate within different frequency ranges, for example, to ensure that the wireless communications of transceiver 510 are sufficiently isolated from the wireless communications of transceiver 560 (and that the wireless communications of transceiver 560 are sufficiently isolated from the wireless communications of transceiver 510). For example, as described above with respect to FIG. 3, the 5 GHz frequency band may be subdivided into lower frequency range 310 and upper frequency range 320. Moreover, wireless channels in the upper frequency range 320 may be separated from wireless channels in the lower frequency range 310 by at least a threshold bandwidth (e.g., 120 MHz).

Still further, for some embodiments, a sub-band synchronization logic 550 may coordinate channel selection for each of the UF synthesizer 530 and the LF synthesizer 540. More specifically, the sub-band synchronization logic 550 may ensure that the operating frequencies of both the UF synthesizer 530 and LF synthesizer 540 belong to the same group of sub-bands. For example, as described above with respect to FIG. 3, sub-bands (e.g., UNII-1 and UNII-2) of the lower frequency range 310 may be grouped together or paired with sub-bands (e.g., UNII-2e and UNII-3) of the upper frequency range 320. Accordingly, the sub-band synchronization logic 550 may coordinate the channel selection for both the UF synthesizer 530 and LF synthesizer 540 to ensure that both synthesizers 530 and 540 operate within respective sub-bands of group A (e.g., UNII-1 and UNII-2e, respectively) or within respective sub-bands of group B (e.g., UNII-2 and UNII-3, respectively). This may further ensure an even greater threshold of separation (e.g., at least 220 MHz) between operating frequencies of the UF synthesizer 530 and the LF synthesizer 540.

By coordinating channel selections for the frequency synthesizers 530 and 540, the example embodiments may significantly reduce and/or limit interference between the transceivers 510 and 560 operating concurrently in the same frequency band. For example, the sub-band synchronization logic 550 may effectively isolate transceiver 510 from transceiver 560 (e.g., by ensuring that there is a threshold frequency gap or separation between their respective operating frequencies).

Further, increasing the isolation (e.g., separation) between wireless channels in the upper frequency range from wireless channels in the lower frequency range may allow for improved filtering of wireless signals in the radio frequency (RF) domain. For example, when the transceivers 510 and 560 are synchronized to group A, the upper-frequency transceiver (e.g., transceiver 510) may operate only within the UNII-2e sub-band, while the lower-frequency transceiver (e.g., transceiver 560) may operate only within the UNII-1 sub-band. With reference to the frequency spectrum diagram 600A of FIG. 6A, the closest channels that the transceivers 510 and 560 could potentially operate on include the uppermost channel of the UNII-1 sub-band (e.g., channel 202, as shown in FIG. 2) and the lowermost channel of the UNII-2e sub-band (e.g., channel 205). The respective bandwidths of channels 202 and 205 are separated by a frequency gap that is 220 MHz wide.

Because the transceivers in the example embodiments maintain a significant amount of frequency separation, additional filtering may be implemented in the RF domain to further isolate the carrier frequencies within each of the UNII-1 and UNII-2e sub-bands from unwanted frequencies in the remainder of the 5 GHz frequency spectrum. For example, with reference to the frequency spectrum diagram 600B of FIG. 6B, a first RF filter may be used to attenuate signals that fall outside of the range of frequencies associated with the UNII-1 sub-band (e.g., 5.15-5.25 GHz), and a second RF filter may be used to attenuate signals that fall outside the range of frequencies associated with the UNII-2e sub-band (e.g., 5.470-5.725 GHz).

Figure 7A:
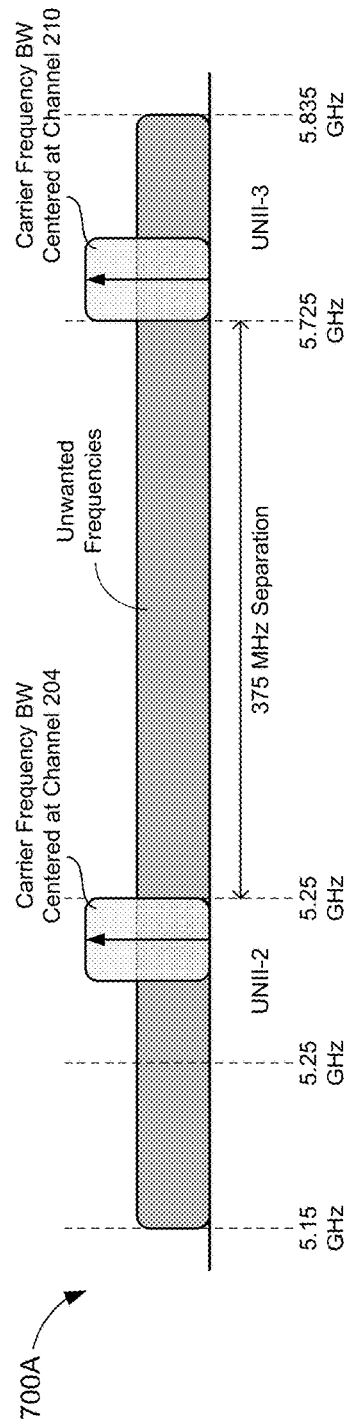
FIGS. 7A-7B are frequency spectrum diagrams depicting another example configuration of a pair of sub-band synchronized transceivers.

When the transceivers 510 and 560 are synchronized to group B, the upper-frequency transceiver (e.g., transceiver 510) may operate only within the UNII-3 sub-band, while the lower-frequency transceiver (e.g., transceiver 560) may operate only within the UNII-2 sub-band. With reference to the frequency spectrum diagram 700A of FIG. 7A, the closest channels that the transceivers 510 and 560 could potentially operate on include the uppermost channel of the UNII-2 sub-band (e.g., channel 204) and the lowermost channel of the UNII-3 sub-band (e.g., channel 210). The respective bandwidths of channels 204 and 210 are separated by a frequency gap that is 365 MHz wide.

Figure 7B:
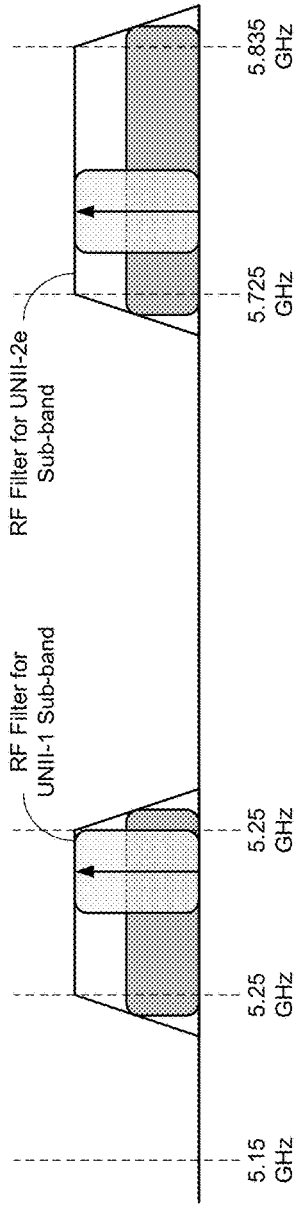

As described above, additional filtering may be implemented in the RF domain to further isolate the carrier frequencies within each of the UNII-2 and UNII-3 sub-bands from unwanted frequencies in the remainder of the 5 GHz frequency spectrum. For example, with reference to the frequency spectrum diagram 700B of FIG. 7B, a first RF filter may be used to attenuate signals that fall outside of the range of frequencies associated with the UNII-2 sub-band (e.g., 5.25-5.35 GHz), and a second RF filter may be used to attenuate signals that fall outside the range of frequencies associated with the UNII-3 sub-band (e.g., 5.725-5.835 GHz).

As described above, RF filters may be used to further reduce or mitigate the effects of signal interference between wireless signals transmitted and/or received by the transceivers 510 and 560. In example embodiments, because a threshold amount of frequency separation is maintained between the transceivers 510 and 560, sufficient stop-band attenuation may be achieved using low-cost microstrip filters.

Figure 3:
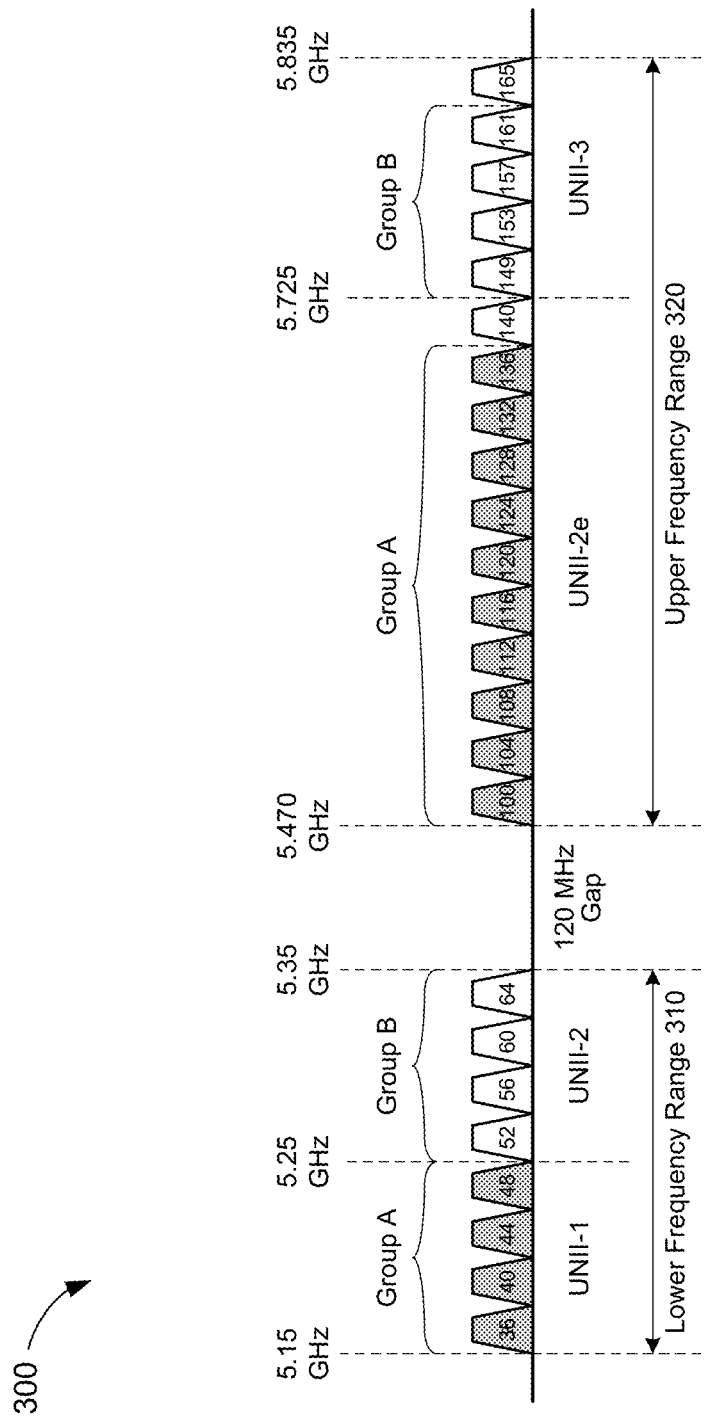
FIG. 3 shows an example subdivision and grouping of sub-bands of the 5 GHz frequency band shown in FIG. 2.
Figure 8:
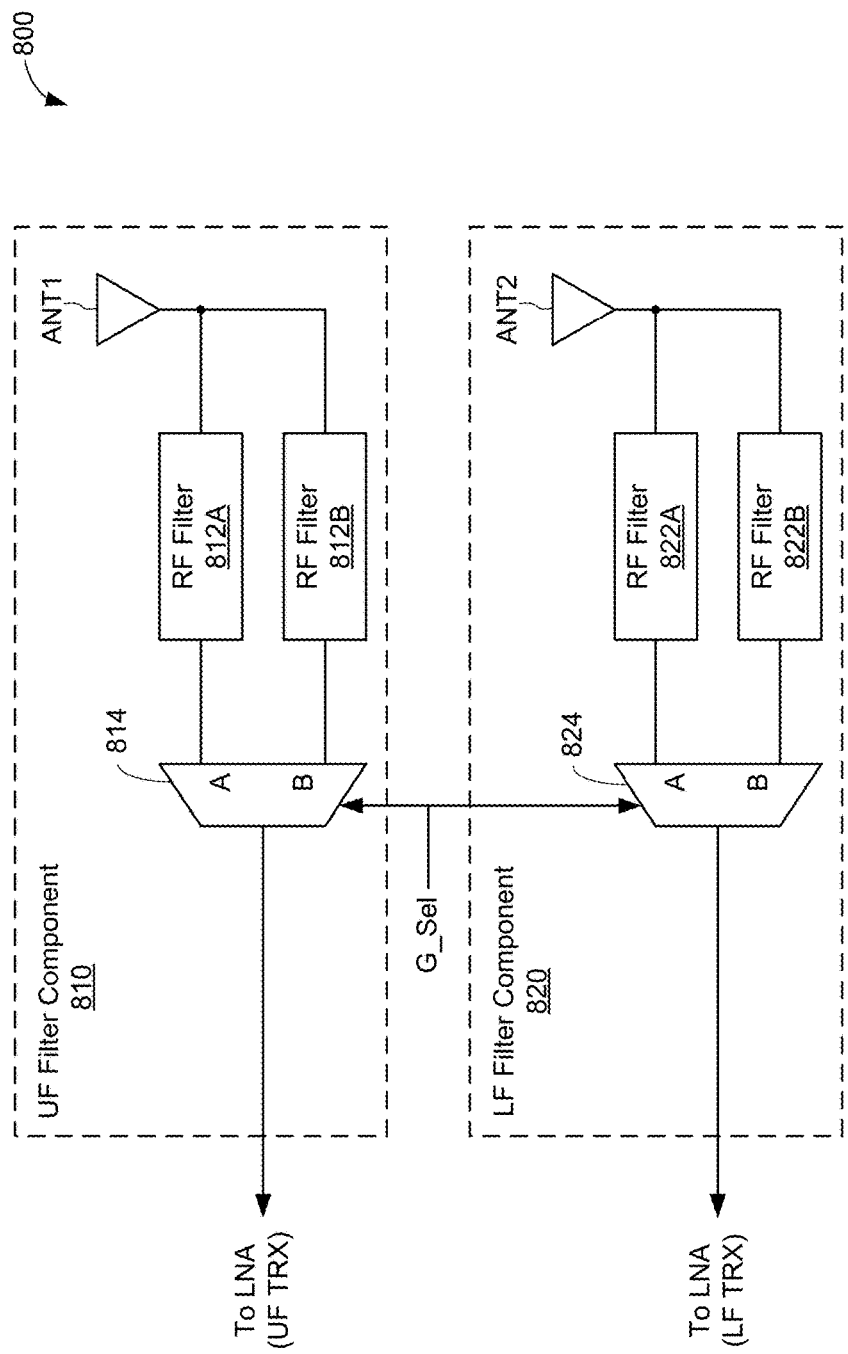
FIG. 8 is a block diagram depicting an example RF filter system, in accordance with example embodiments.

FIG. 8 shows a block diagram depicting an example RF filter system 800, in accordance with example embodiments. The RF filter system 800 includes a UF filter component 810 and an LF filter component 820. The UF filter component 810 may be used to filter received wireless signals in an upper frequency range of a given frequency band (e.g., upper frequency range 320 of the 5 GHz frequency band, as shown in FIG. 3), and LF filter component 820 may be used to filter received wireless signals in a lower frequency range of the same frequency band (e.g., lower frequency range 310 of the 5 GHz frequency band). Although not shown for simplicity, the RF filter system 800 may include additional RF filter circuitry for filtering outgoing data signals. For example, the RF filter system 800 may filter outgoing data signals in the same, or substantially similar, manner as received signals (e.g., as described below with reference to FIG. 8).

The UF filter component 810 includes a first RF filter 812A, a second RF filter 812B, and a multiplexer 814 to selectively output filtered signals from one of the filters 812A or 812B. For example, RF filter 812A may be a band-pass filter to attenuate signals that fall outside a range of frequencies belonging to a first sub-band (e.g., UNII-2e) of the upper frequency range, and RF filter 812B may be a band-pass filter to attenuate signals that fall outside a range of frequencies belonging to a second sub-band (e.g. UNII-3) of the upper frequency range. As described above, with respect to FIG. 3, the UNII-2e sub-band may belong to a first group of sub-bands (e.g., group A) of the 5 GHz frequency band, and the UNII-3 sub-band may belong to a second group of sub-bands (e.g., group B) of the 5 GHz frequency band.

For some embodiments, the multiplexer 814 may selectively output filtered signals from one of the RF filters 812A or 812B in response to a group select (G_Sel) signal. The G_Sel signal may be provided by a processor and/or channel selection module (e.g., the sub-band synchronization logic 550 of FIG. 5) of an underlying wireless device, and may indicate a selection of the first group of sub-bands (e.g., "group A") or the second group of sub-bands (e.g., "group B"). For example, if the G_Sel signal indicates "group A," the multiplexer 814 may output filtered wireless signals from RF filter 812A to an LNA of an upper-frequency transceiver (UF TRX) of the underlying wireless device. If the G_Sel signal indicates "group B," the multiplexer 814 may output filtered wireless signals from RF filter 812B to the LNA of the UF TRX (e.g., transceiver 510 of FIG. 5).

The LF filter component 820 includes a first RF filter 822A, a second RF filter 822B, and a multiplexer 824 to selectively output filtered signals from one of the RF filters 822A or 822B. For example, RF filter 822A may be a band-pass filter to attenuate signals that fall outside a range of frequencies belonging to a first sub-band (e.g., UNII-1) of the lower frequency range, and RF filter 822B may be a band-pass filter to attenuate signals that fall outside a range of frequencies belonging to a second sub-band (e.g., UNII-2) of the lower frequency range. As described above, with respect to FIG. 3, the UNII-1 sub-band may belong to a first group of sub-bands (e.g., group A) of the 5 GHz frequency band, and the UNII-2 sub-band may belong to a second group of sub-bands (e.g., group B) of the 5 GHz frequency band.

For some embodiments, the multiplexer 824 may selectively output filtered signals from one of the RF filters 822A or 822B in response to the G_Sel signal. For example, if the G_Sel signal indicates "group A," the multiplexer 824 may output filtered wireless signals from RF filter 812A to an LNA of a lower-frequency transceiver (LF TRX) of the underlying wireless device. If the G_Sel signal indicates "group B," the multiplexer 824 may output filtered wireless signals from RF filter 812B to the LNA of the LF TRX (e.g., transceiver 560 of FIG. 5).

In an example embodiment, the RF filters 812A, 812B, 822A, and/or 822B may utilize planar bandpass filter topologies. For example, the RF filters 812A, 812B, 822A, and/or 822B may be implemented as microstrip resonators with embedded cross-coupling. More specifically, microstrip resonators may provide good isolation and insertion loss for both the upper-frequency transceiver and the lower-frequency transceiver, and may be interfaced easily with the analog front-end (AFE) circuitry of the respective transceivers (e.g., as an add-on card).

Figure 9:
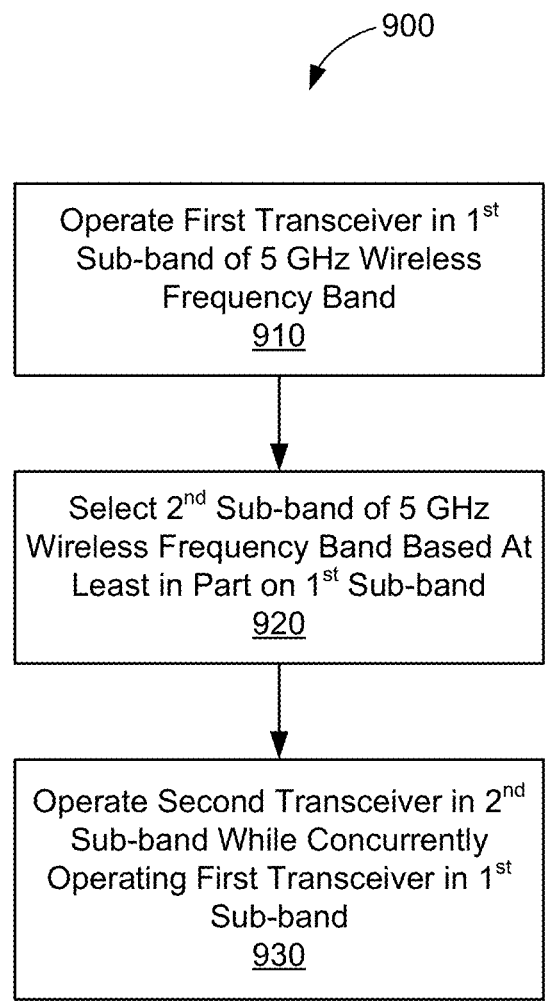
FIG. 9 shows a flowchart depicting a sub-band synchronization operation for at least two transceivers of a multi-transceiver device.

FIG. 9 shows a flowchart depicting a sub-band synchronization operation 900 for at least two transceivers of a multi-transceiver device. With reference, for example, to FIG. 4, the example operation 900 may be performed by the wireless device 400 to operate two transceivers, concurrently, in the 5 GHz wireless frequency band.

The wireless device 400 operates a first transceiver (e.g., TRX1) in a first sub-band of the 5 GHz wireless frequency band (910). For some embodiments, the operating frequency of the first transceiver TRX1 may be selected based on one or more channel allocation schemes (e.g., Dynamic Frequency Selection (DFS), Dynamic Channel Assignment (DCA), etc.). For example, the wireless device 400 may scan all available channels in the 5 GHz frequency spectrum for noise and/or interference. The wireless device 400 may then select the channel with the least amount of interference (e.g., or the first scanned channel with interference below a threshold level) on which to operate the first transceiver TRX1. In other embodiments, the operating frequency of the first transceiver TRX1 may be selected arbitrarily (e.g., completely at random). As described above, with respect to FIG. 2, each 5 GHz channel is associated with a particular sub-band (e.g., UNII-1, UNII-2, UNII-2e, or UNII-3).

The wireless device 400 then selects a second sub-band of the 5 GHz wireless frequency band based at least in part on the first sub-band (920). For example, the processor 420 may execute the TRX2 channel selection module 436 to select the second sub-band. The processor 420, in executing the TRX2 channel selection module 436, may select the second sub-band to be a sub-band that is complementary to the first sub-band based at least in part on the frequency sub-division map 432. As used herein, two sub-bands may be "complementary" to each other if one of the sub-bands is within the lower frequency range 310 and the other of the sub-bands is within the upper frequency range 320 (e.g., as described above with respect to FIG. 3). For example, if the first sub-band is in the lower frequency range 310 (e.g., UNII-1 or UNII-2), the wireless device 400 may select a sub-band in the upper frequency range 320 (e.g., UNII-2e or UNII-3) as the second sub-band. Further, for some embodiments, the wireless device 400 may select a different sub-band belonging to the same group as the first sub-band (e.g., as described above with respect to FIG. 3). For example, if the first sub-band is in the lower frequency range 310 and belongs to group A (e.g., UNII-1), the wireless device 400 may select a sub-band in the upper frequency range 320 that also belongs to group A (e.g., UNII-2e) as the second sub-band.

Finally, the wireless device 400 may operate a second transceiver (e.g., TRX2) in the second sub-band while concurrently operating the first transceiver TRX1 in the first sub-band (930). By selecting a second sub-band that is complementary to the first sub-band, the wireless device 400 may ensure that there is a sufficient buffer between the operating frequencies of the first transceiver TRX1 and the second transceiver TRX2. For example, with reference to FIG. 3, wireless channels in the lower frequency range 310 are separated from wireless channels in the upper frequency range 320 by at least 120 MHz. Further, wireless channels belonging to different sub-bands of group A are separated by at least 220 MHz, and wireless channels belonging to different sub-bands of group B are separated by at least 365 MHz. The threshold frequency separation between the first sub-band and the second sub-band may help ensure concurrent operation of the first transceiver TRX1 and the second transceiver TRX2 in the 5 GHz wireless frequency band.

Figure 10:
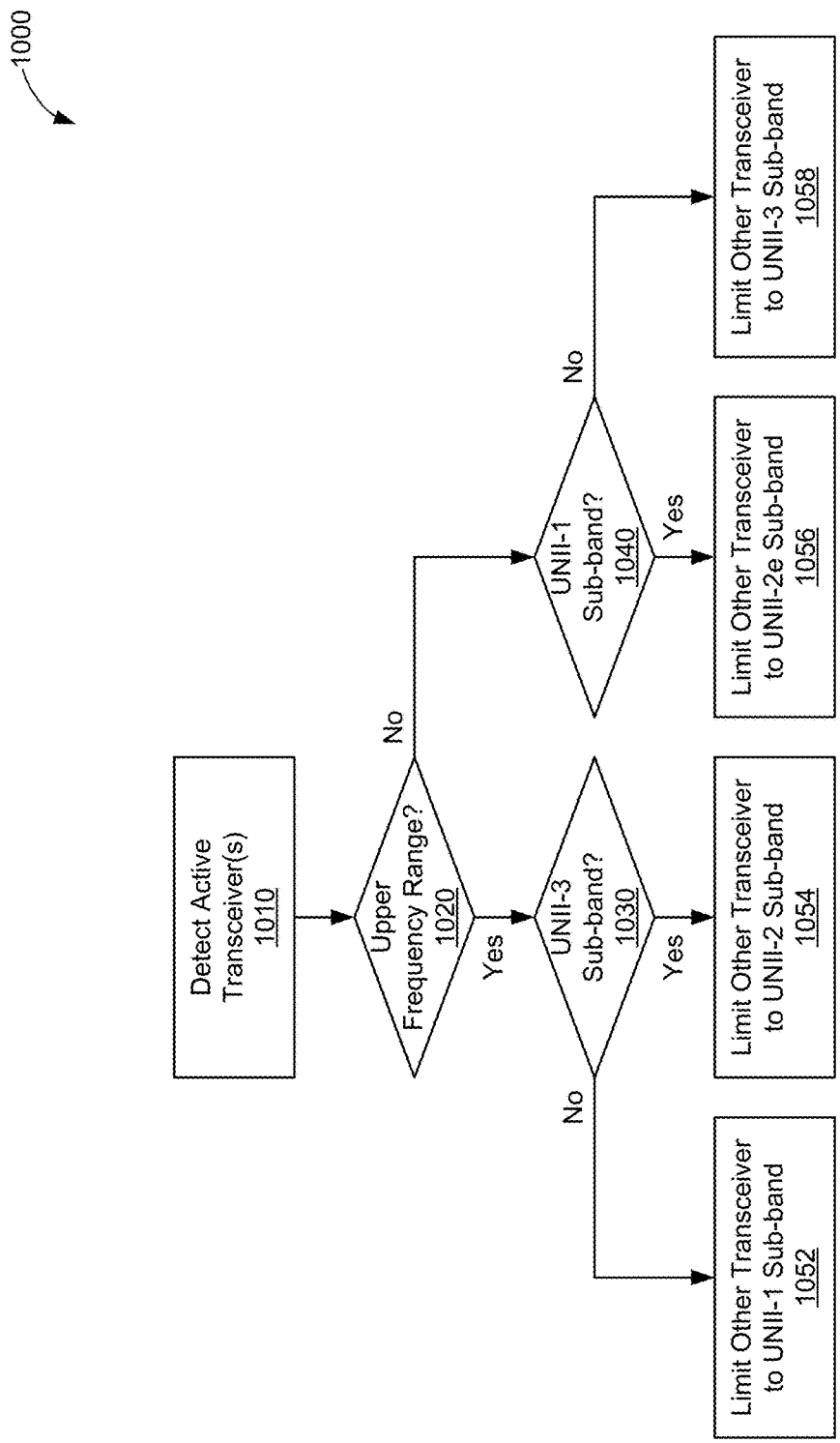
FIG. 10 shows a flowchart depicting a sub-band selection operation for a transceiver of a multi-transceiver device.

FIG. 10 shows a flowchart depicting a sub-band selection operation 1000 for a transceiver of a multi-transceiver device. With reference, for example, to FIG. 4, the operation 1000 may be performed by the wireless device 400 to operate two transceivers (e.g., TRX1 and TRX2, which may correspond with transceivers 510 and 560, respectively, of wireless radio 500), concurrently, in the 5 GHz wireless frequency band. In particular, the operation 1000 may be performed by the processor 420, in executing the TRX1 channel select module 434 and/or TRX2 channel select module 436, to select an operating frequency (e.g., channel) and/or sub-band for a particular transceiver that operates in the same frequency band (e.g., the 5 GHz frequency band) as another transceiver of the wireless radio 410.

The wireless device 400 first detects whether any of its transceivers are active (1010). For example, a transceiver may be active if it is transmitting and/or receiving wireless signals. However, a transceiver may also be active if it is connected (e.g., wirelessly) to another wireless device or transceiver, even if it is not in the process of transmitting or receiving wireless signals (e.g., the transceiver may be in a low-power idle state).

Upon detecting an active transceiver, the wireless device 400 may then determine whether the active transceiver operates in the upper frequency range (e.g., or the lower frequency range) of the 5 GHz frequency band (1020). For example, TRX1 may be configured to operate in the upper frequency range (e.g., 5.470-5.835 GHz) of the 5 GHz frequency band, whereas TRX2 may be configured to operate in the lower frequency range (e.g., 5.15-5.35 GHz) of the 5 GHz frequency band. As described above, with reference to FIG. 3, the upper and lower frequency ranges are separated by a 120 MHz frequency gap.

If the wireless device 400 determines that the active transceiver operates in the upper frequency range (e.g., TRX1 is active, as tested at 1020), it may then determine whether the operating frequency of the active transceiver falls within the UNII-3 sub-band (e.g., or the UNII-2e sub-band) of the 5 GHz frequency band (1030). For example, with reference to FIG. 2, channels 205-209 belong to the UNII-2e sub-band, whereas channels 210 and 211 belong to the UNII-3 sub-band. Further, with reference to FIG. 3, the UNII-2e sub-band belongs to a first group of sub-bands (e.g., group A), whereas the UNII-3 sub-band belongs to a second group of sub-bands (e.g., group B).

If the active transceiver does not operate in the UNII-3 sub-band (e.g., but rather, operates in the UNII-2e sub-band) (as tested at 1030), the wireless device 400 may limit the channel selection for the other transceiver (e.g., TRX2) to the UNII-1 sub-band (e.g., 5.15-5.25 GHz) of the 5 GHz frequency band (1052). As described above, with respect to FIG. 3, the UNII-1 and UNII-2e sub-bands belong to the same group of sub-bands (e.g., group A), and are separated by 220 MHz. Thus, to ensure that TRX2 is sufficiently frequency-isolated from (e.g., does not interfere with) TRX1, the processor 420 may execute the TRX2 channel select module 436 to select an operating frequency for TRX2 that is within the UNII-1 sub-band (e.g., channels 201 and 202), only.

If the active transceiver operates in the UNII-3 sub-band (as tested at 1030), the wireless device 400 may limit the channel selection for the other transceiver (e.g., TRX2) to the UNII-2 sub-band (e.g., 5.25-5.35 GHz) of the 5 GHz frequency band (1054). As described above, with respect to FIG. 3, the UNII-2 and UNII-3 sub-bands belong to the same group of sub-bands (e.g., group B), and are separated by 365 MHz. Thus, to ensure that TRX2 is sufficiently frequency-isolated from TRX1, the processor 420 may execute the TRX2 channel select module 436 to select an operating frequency for TRX2 that is within the UNII-2 sub-band (e.g., channels 203 and 204), only.

If the wireless device 400 determines that the active transceiver operates in the lower frequency range (e.g., TRX2 is active, as tested at 1020), it may then determine whether the operating frequency of the active transceiver falls within the UNII-1 sub-band (e.g., or the UNII-2 sub-band) of the 5 GHz frequency band (1040). For example, with reference to FIG. 2, channels 201 and 202 belong to the UNII-1 sub-band, whereas channels 203 and 204 belong to the UNII-2 sub-band. Further, with reference to FIG. 3, the UNII-1 sub-band belongs to a first group of sub-bands (e.g., group A), whereas the UNII-3 sub-band belongs to a second group of sub-bands (e.g., group B).

If the active transceiver operates in the UNII-1 sub-band (as tested at 1040), the wireless device 400 may limit the channel selection for the other transceiver (e.g., TRX1) to the UNII-2e sub-band (e.g., 5.470-5.725 GHz) of the 5 GHz frequency band (1056). As described above, the UNII-1 and UNII-2e sub-bands belong to the same group of sub-bands (e.g., group A), and are separated by 220 MHz. Thus, to ensure that TRX1 is sufficiently frequency-isolated from TRX2, the processor 420 may execute the TRX1 channel select module 434 to select an operating frequency for TRX1 that is within the UNII-2e sub-band (e.g., channels 205-209), only.

If the active transceiver does not operate in the UNII-1 sub-band (e.g., but rather operates in the UNII-2 sub-band) (as tested at 1040), the wireless device 400 may limit the channel selection for the other transceiver (e.g., TRX2) to the UNII-3 sub-band (e.g., 5.725-5.835 GHz) of the 5 GHz frequency band (1058). As described above, the UNII-2 and UNII-3 sub-bands belong to the same group of sub-bands (e.g., group B), and are separated by 365 MHz. Thus, to ensure that TRX1 is sufficiently frequency-isolated from TRX2, the processor 420 may execute the TRX1 channel select module 434 to select an operating frequency for TRX1 that is within the UNII-3 sub-band (e.g., channels 210 and 211), only.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method comprising:
   operating a first transceiver of a wireless device in a first sub-band of a 5 GHz wireless frequency band;
   selecting a second sub-band of the 5 GHz wireless frequency band based at least in part on a frequency of the first sub-band, wherein:

a frequency spectrum of the 5 GHz wireless frequency band is subdivided into at least a first range of frequencies and a second range of frequencies such that each of a plurality of sub-bands of the 5 GHz wireless frequency band is within one of the first range of frequencies or the second range of frequencies;

an upper bound of the first range of frequencies is at least a threshold frequency gap below a lower bound of the second range of frequencies; and selecting the second sub-band comprises:
    selecting the second sub-band from the second range of frequencies when the first sub-band is within the first range of frequencies; and
    selecting the second sub-band from the first range of frequencies when the first sub-band is within the second range of frequencies; and operating a second transceiver of the wireless device in the second sub-band while concurrently operating the first transceiver in the first sub-band.

2. The method of claim 1, wherein the threshold frequency gap is 220 MHz.

3. The method of claim 1, wherein the threshold frequency gap is 120 MHz.

4. The method of claim 1, wherein the first range of frequencies includes Unlicensed National Information Infrastructure (UNII) radio bands UNII-1 and UNII-2, and wherein the second range of frequencies includes UNII radio bands UNII-2e and UNII-3.

5. The method of claim 1, further comprising:
    filtering communications for at least one of the first transceiver or the second transceiver using a microstrip filter.

6. The method of claim 1, further comprising:
    operating a third transceiver of the wireless device in a 2.4 GHz wireless frequency band while concurrently operating the first and second transceivers in the respective first and second sub-bands of the 5 GHz wireless frequency band.

7. A communications device, comprising:
    a first transceiver operable in a 5 GHz wireless frequency band;
    a second transceiver operable in the 5 GHz wireless frequency band;
    one or more processors; and
    a memory storing instructions that, when executed by the one or more processors, cause the communications device to:
        operate the first transceiver in a first sub-band of the 5 GHz wireless frequency band;
        select a second sub-band of the 5 GHz wireless frequency band based at least in part on a frequency of the first sub-band, wherein:
            a frequency spectrum of the 5 GHz wireless frequency band is subdivided into at least a first range of frequencies and a second range of frequencies such that each of a plurality of sub-bands of the 5 GHz wireless frequency band is within one of the first range of frequencies or the second range of frequencies;
            an upper bound of the first range of frequencies is at least a threshold frequency gap below a lower bound of the second range of frequencies; and
            selecting the second sub-band comprises:
                selecting the second sub-band from the second range of frequencies when the first sub-band is within the first range of frequencies; and
                selecting the second sub-band from the first range of frequencies when the first sub-band is within the second range of frequencies; and
        operate the second transceiver in the second sub-band while concurrently operating the first transceiver in the first sub-band.

8. The communications device of claim 7, wherein the threshold frequency gap is 220 MHz.

9. The communications device of claim 7, wherein the threshold frequency gap is 120 MHz.

10. The communications device of claim 7, wherein the first range of frequencies includes Unlicensed National Information Infrastructure (UNII) radio bands UNII-1 and UNII-2, and wherein the second range of frequencies includes UNII radio bands UNII-2e and UNII-3.

11. The communications device of claim 7, further comprising:
    a microstrip filter to filter communications for at least one of the first transceiver or the second transceiver.

12. The communications device of claim 7, further comprising:
    a third transceiver operable in a 2.4 GHz wireless frequency band while concurrently operating the first and second transceivers in the respective first and second sub-bands of the 5 GHz wireless frequency band.

13. A non-transitory computer-readable storage medium containing program instructions that, when executed by a processor of a communications device, cause the communications device to:
    operate a first transceiver of the communications device in a first sub-band of a 5 GHz frequency band;
    select a second sub-band of the 5 GHz wireless frequency band based at least in part on a frequency of the first sub-band, wherein:
        a frequency spectrum of the 5 GHz wireless frequency band is subdivided into at least a first range of frequencies and a second range of frequencies such that each of a plurality of sub-bands of the 5 GHz wireless frequency band is within one of the first range of frequencies or the second range of frequencies;
        an upper bound of the first range of frequencies is at least a threshold frequency gap below a lower bound of the second range of frequencies; and
        selecting the second sub-band comprises:
            selecting the second sub-band from the second range of frequencies when the first sub-band is within the first range of frequencies; and
            selecting the second sub-band from the first range of frequencies when the first sub-band is within the second range of frequencies; and
    operate a second transceiver of the communications device in the second sub-band while concurrently operating the first transceiver in the first sub-band.

14. The non-transitory computer-readable storage medium of claim 13, wherein the threshold frequency gap is 220 MHz.

* * * * *